US006234440B1

(12) United States Patent
Boney et al.

(10) Patent No.: US 6,234,440 B1
(45) Date of Patent: May 22, 2001

(54) CORNICE INSTALLATION SUPPORT SYSTEM

(76) Inventors: Eugene N. Boney; Ruby E. Boney, both of 6431 S. Sandtrap Dr., Gold Canyon, AZ (US) 85219-6474

( * ) Notice: Subject to any disclaimer, the term of this patent is extended or adjusted under 35 U.S.C. 154(b) by 0 days.

(21) Appl. No.: 09/428,883

(22) Filed: Oct. 28, 1999

(51) Int. Cl.[7] .................................. A47F 5/00; B60P 1/00

(52) U.S. Cl. ........................................ 248/354.1; 254/2 R

(58) Field of Search ................................ 248/354.1, 351, 248/122.1, 125.8, 124.1, 407, 161, 354.7; 254/2 R, 89 R, 108, 116

(56) References Cited

U.S. PATENT DOCUMENTS

| | | | | |
|---|---|---|---|---|
| D. 353,754 | | 12/1994 | Carlisle . | |
| 2,583,945 | * | 1/1952 | Jacobs | 254/108 |
| 2,696,359 | * | 12/1954 | Hill | 318/677 |
| 2,858,094 | * | 10/1958 | Olson | 254/116 |
| 3,734,441 | | 5/1973 | Lux . | |
| 3,802,658 | * | 4/1974 | Binding | 248/352 |
| 3,991,852 | * | 11/1976 | Brookes et al. | 182/169 |
| 4,339,104 | * | 7/1982 | Weidman | 248/407 |
| 4,583,712 | * | 4/1986 | Wilks | 254/89 R |
| 4,695,028 | | 9/1987 | Hunter . | |
| 4,733,844 | | 3/1988 | Molloy . | |
| 4,928,916 | | 5/1990 | Molloy . | |
| 5,060,946 | * | 10/1991 | Taylor | 473/429 |
| 5,129,774 | | 7/1992 | Balseiro et al. . | |
| 5,156,395 | * | 10/1992 | Smith | 473/483 |
| 5,180,131 | * | 1/1993 | Few | 248/352 |
| 5,238,251 | * | 8/1993 | Staka | 473/429 |
| 5,540,429 | * | 7/1996 | Dalebout et al. | 473/483 |
| 6,135,419 | * | 10/2000 | Hutson, Jr. et al. | 254/2 R |

* cited by examiner

*Primary Examiner*—Anita M. King

(57) ABSTRACT

A cornice installation support system for supporting cornices of different widths at varying heights. The cornice installation support system includes a pair of support devices. Each support device comprises a tubular member, an extension arm and a support mount. The tubular member has a first end and a second end. An elongate extension arm extends the tubular member. The extension arm has a shape adapted to fit in the first end of the tubular member and has a first side with teeth thereon. A first and second bore is located in the tubular member. The first and second bores are diametrically opposed to each other. A gear extends the extension arm out of the tubular member. The gear has teeth thereon. A rod has the gear mounted thereon. The rod is rotatably mounted in the first and second bores, and the gear is intermeshed with the teeth on the extension arm. A mounting assembly receives the cornice. The mounting assembly has an L-shaped portion and is mounted to an end of the extension arm.

9 Claims, 3 Drawing Sheets

CORNICE INSTALLATION SUPPORT SYSTEM

BACKGROUND OF THE INVENTION

1. Field of the Invention

The present invention relates to support devices and more particularly pertains to a new cornice installation support system for that will support cornices of different widths at varying heights.

2. Description of the Prior Art

The use of support devices is known in the prior art. More specifically, support devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,733,844; U.S. Pat. No. 5,129,774; U.S. Pat. No. 4,928,916; U.S. Pat. No. 3,734,441; U.S. Pat. No. 4,695,028; and U.S. Pat. Des. No. 353,754.

While these devices fulfill their respective, particular objectives and requirements, the aforementioned patents do not disclose a new cornice installation support system. The inventive device includes a pair of support devices. Each support device comprises a tubular member, an extension arm and a support mount. The tubular member has a first end and a second end. An elongate extension arm extends the tubular member. The extension arm has a shape adapted to fit in the first end of the tubular member and has a first side with teeth thereon. A first and second bore is located in the tubular member. The first and second bores are diametrically opposed to each other. A gear extends the extension arm out of the tubular member. The gear has teeth thereon. A rod has the gear mounted thereon. The rod is rotatably mounted in the first and second bores, and the gear is intermeshed with the teeth on the extension arm. A mounting assembly receives the cornice. The mounting assembly has an L-shaped portion and is mounted to an end of the extension arm.

In these respects, the cornice installation support system according to the present invention substantially departs from the conventional concepts and designs of the prior art, and in so doing provides an apparatus primarily developed for the purpose of that will support cornices of different widths at varying heights.

SUMMARY OF THE INVENTION

In view of the foregoing disadvantages inherent in the known types of support devices now present in the prior art, the present invention provides a new cornice installation support system construction wherein the same can be utilized for that will support cornices of different widths at varying heights.

The general purpose of the present invention, which will be described subsequently in greater detail, is to provide a new cornice installation support system apparatus and method which has many of the advantages of the support devices mentioned heretofore and many novel features that result in a new cornice installation support system which is not anticipated, rendered obvious, suggested, or even implied by any of the prior art support devices, either alone or in any combination thereof.

To attain this, the present invention generally comprises a pair of support devices. Each support device comprises a tubular member, an extension arm and a support mount. The tubular member has a first end and a second end. An elongate extension arm extends the tubular member. The extension arm has a shape adapted to fit in the first end of the tubular member and has a first side with teeth thereon. A first and second bore is located in the tubular member. The first and second bores are diametrically opposed to each other. A gear extends the extension arm out of the tubular member. The gear has teeth thereon. A rod has the gear mounted thereon. The rod is rotatably mounted in the first and second bores, and the gear is intermeshed with the teeth on the extension arm. A mounting assembly receives the cornice. The mounting assembly has an L-shaped portion and is mounted to an end of the extension arm.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cornice installation support system apparatus and method which has many of the advantages of the support devices mentioned heretofore and many novel features that result in a new cornice installation support system which is not anticipated, rendered obvious, suggested, or even implied by any of the prior art support devices, either alone or in any combination thereof.

It is another object of the present invention to provide a new cornice installation support system which may be easily and efficiently manufactured and marketed.

It is a further object of the present invention to provide a new cornice installation support system which is of a durable and reliable construction.

An even further object of the present invention is to provide a new cornice installation support system which is susceptible of a low cost of manufacture with regard to both materials and labor, and which accordingly is then susceptible of low prices of sale to the consuming public, thereby making such cornice installation support system economically available to the buying public.

Still yet another object of the present invention is to provide a new cornice installation support system which provides in the apparatuses and methods of the prior art some of the advantages thereof, while simultaneously overcoming some of the disadvantages normally associated therewith.

Still another object of the present invention is to provide a new cornice installation support system for that will support cornices of different widths at varying heights.

Yet another object of the present invention is to provide a new cornice installation support system which includes a pair of support devices. Each support device comprises a tubular member, an extension arm and a support mount. The tubular member has a first end and a second end. An elongate extension arm extends the tubular member. The extension arm has a shape adapted to fit in the first end of the tubular member and has a first side with teeth thereon. A first and second bore is located in the tubular member. The first and second bores are diametrically opposed to each other. A gear extends the extension arm out of the tubular member. The gear has teeth thereon. A rod has the gear mounted thereon. The rod is rotatably mounted in the first and second bores, and the gear is intermeshed with the teeth on the extension arm. A mounting assembly receives the cornice. The mounting assembly has an L-shaped portion and is mounted to an end of the extension arm.

Still yet another object of the present invention is to provide a new cornice installation support system that has a mounting assembly which has a variable width for accommodating varying widths of cornices and which swivels to ensure being flush with the wall without having to move the support devices.

Even still another object of the present invention is to provide a new cornice installation support system that is extendable to reach the desired height for installation of the cornice.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
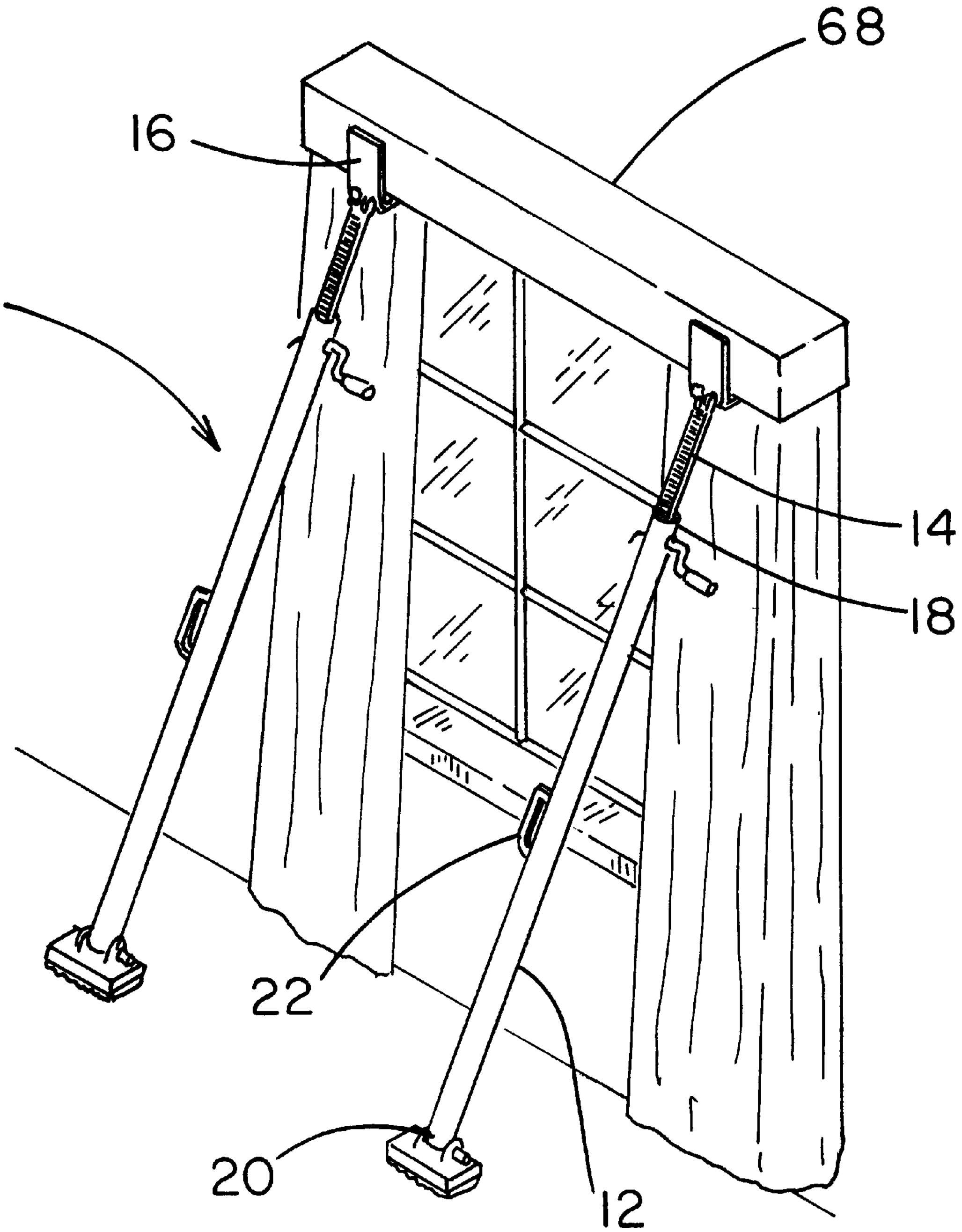
FIG. 1 is a schematic perspective view of a new cornice installation support system according to the present invention.
Figure 2:
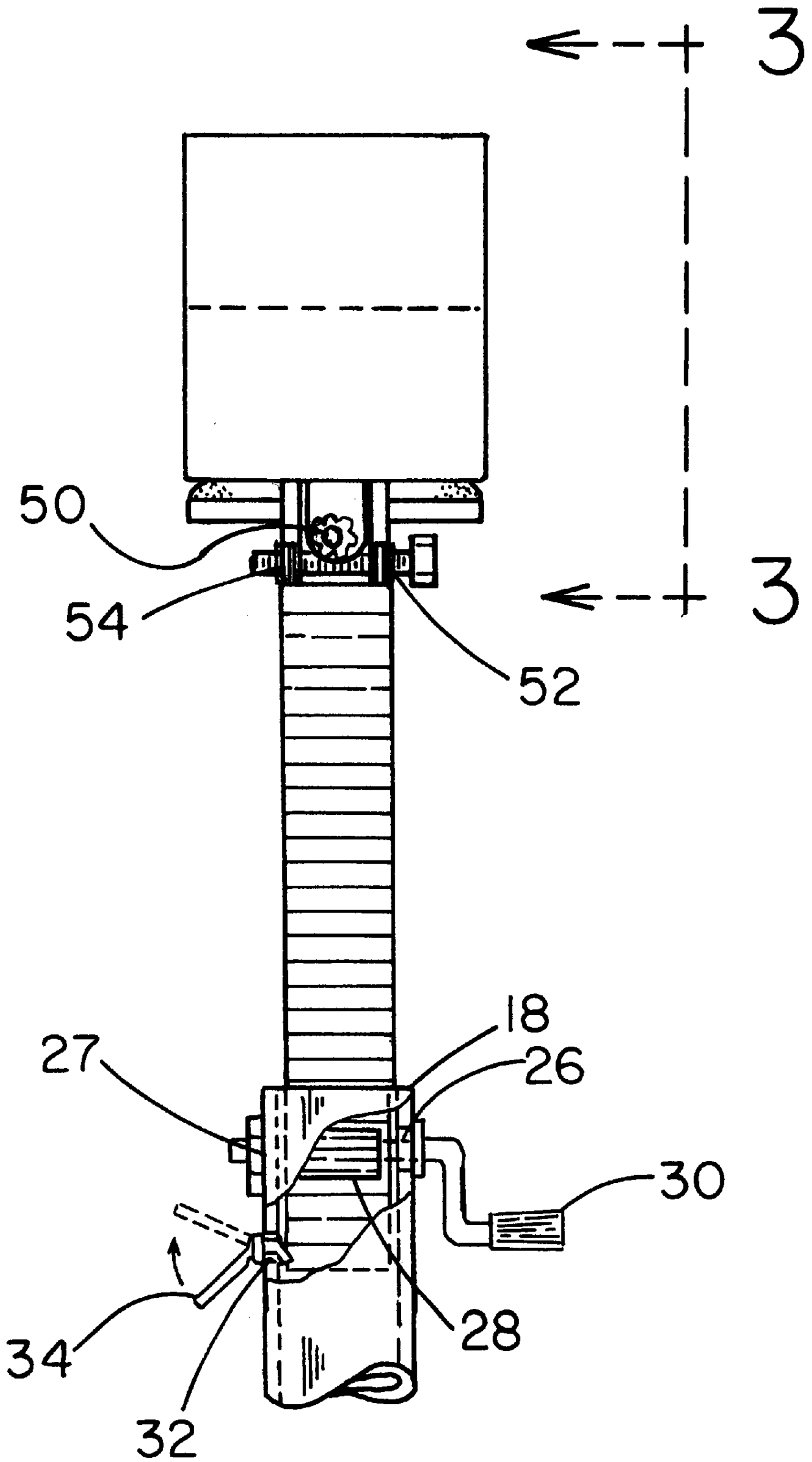
FIG. 2 is a schematic front view of the extension apparatus of the present invention.
Figure 3:
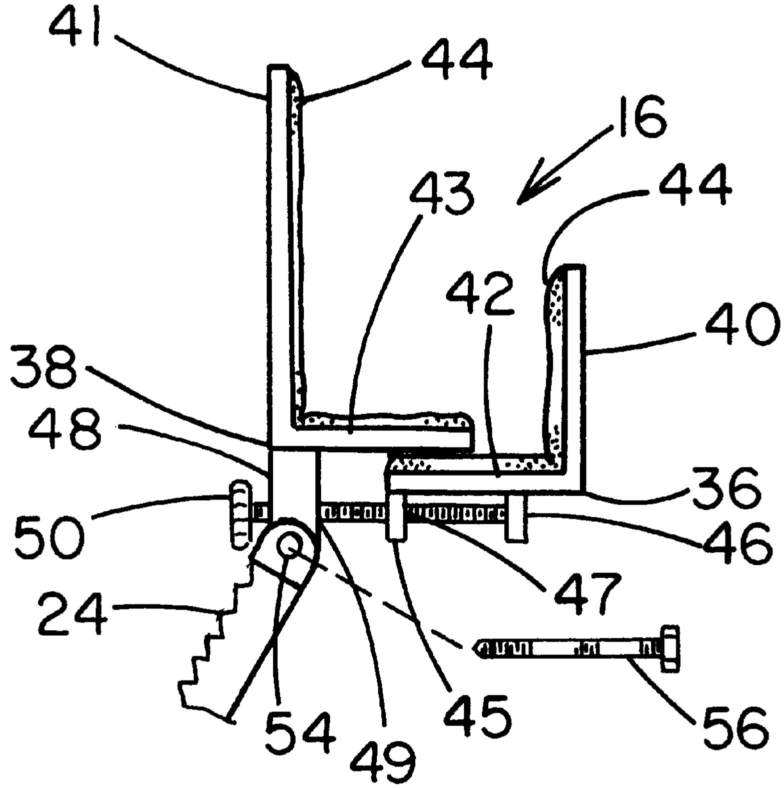
FIG. 3 is a schematic side view of the mounting assembly of the present invention.
Figure 4:
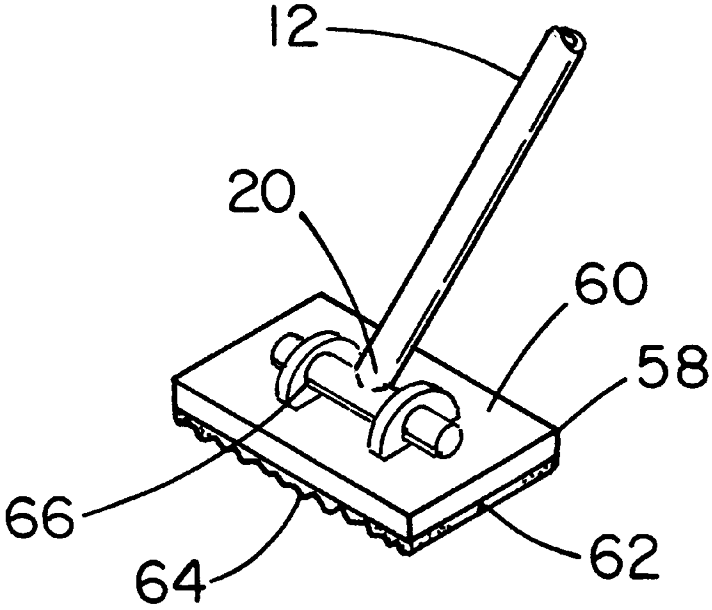
FIG. 4 is a schematic perspective view of the foot pedal of the present invention.

With reference now to the drawings, and in particular to FIGS. 1 through 4 thereof, a new cornice installation support system embodying the principles and concepts of the present invention and generally designated by the reference numeral 10 will be described.

As best illustrated in FIGS. 1 through 4, the cornice installation support system 10 generally comprises a pair of support devices. Each support device comprises a tubular member 12, an extension arm 14 and a mounting assembly 16.

The tubular member 12 is elongate and preferably has a generally cylindrical shape. The tubular member is hollow and has a first end 18 and a second end 20. Ideally, the tubular member has a handle 22 thereon for easy carrying of the support device.

The extension arm 14 for extending from the tubular member 12 is elongate. Preferably, the extension arm 14 has a generally rectangular cross-section taken transverse to a longitudinal axis of the extension arm. The extension arm 14 has a shape adapted to fit in the first end 18 of the tubular member 12. The extension arm 14 has a first side having teeth 24 thereon.

A first 27 and second bore 26 are each located in the tubular member 12. The bores are diametrically opposed to each other. The bores are located generally adjacent to the first end 18 of the tubular member 12.

A gear 28 extends the extension arm 14 out of the tubular member 12. The gear 28 has teeth thereon.

A rod 30 having the gear 28 mounted thereon is rotatably mounted in the first 27 and second bores 26. The gear 28 is intermeshed with the teeth 24 on the extension arm 14.

Preferably, there is a third bore 32 in the tubular member 12 which is generally adjacent to the first bore 27.

A pawl 34 selective secures the extension arm 14 in a position of extension from the tubular member 12. The pawl 34 extends through the third bore 32 and is in selective intermesh with the teeth 24 of the extension arm 14.

A mounting assembly 16 receives the cornice. Preferably, the mounting assembly has a first L-shaped portion 36 and a second L-shaped portion 38. Each of the first 36 and second 38 L-shaped portions have a first wall 40, 41 and a second wall 42, 43. The second walls 42, 43 extend toward each other. The inside faces of the first 36 and second portions 38 are generally oriented in an opposed relationship to each other. The first walls 40, 41 are adapted for being directed upwardly when the mounting assembly 16 is in use. Preferably, the first 40, 41 and second 42, 43 walls have padding 44 thereon for protecting the cornice.

A first 45 and second plate 46 are fixedly coupled to the second wall 42 of the first L-shaped portion 36. The plates 45, 46 extend perpendicularly away from the second wall 42. The first 45 and second 46 plates each have a bore 47 therethough. The bores 47 in the first 45 and second plates 46 are threaded.

A third plate 48 is mounted fixedly to the second wall 43 of the second L-shaped portion 38. The third plate 48 is located generally adjacent to a juncture of the first wall 41 and the second wall 43 of the second L-shaped portion 38. The third plate 48 extends perpendicular away from the second wall 43. The third plate has a first bore 49 therein, wherein the bores in the first, the second and the third plates are oriented generally co-axial to each other.

A first screw 50 for extending and retracting the first L-shape portion 36 with respect to the second L-shape portion 38 is rotatably mounted in the first bore 49 in the third plate 48. The first screw 50 is inserted through each of the bores 47 in the first 45 and second plates 46.

A second bore 52 in the third plate 48 is located generally adjacent to a free end of the third plate 48. The second bore 52 has an axis oriented generally perpendicular to an axis of the first bore 49 in the third plate.

A pair of bores 54 are located adjacent to an end of the extension arm 14 and are diametrically opposed to each other.

A second screw 56 is inserted through the pair of bores 54 in the extension arm and the bore 52 in the third plate. The third plate 48 is located between the pair of bores 54 on the extension arm 14. The third plate 48 is adapted to swivel on the second screw 56, thus allowing the two L-shaped portions 36, 38 to swivel in unison.

A foot pad 58 for resting on a ground surface has a top surface 60 and a bottom surface 62. The bottom surface 62 of the foot pad 58 has an elastomeric covering 64 thereon. A hinge 66 couples the top surface 60 of the foot pad 58 to second end 20 of the tubular member 12. The foot pad 58 may be swiveled in relation to the tubular member 12.

In use, the extension arms 14 are extended to height at which the cornice is to be mounted and locked into place with the pawl 34. Two support devices are spaced on either side of the area where the cornice is to be mounted. The two L-shaped portions 36, 38 of each support device are retracted or extended to the width to support the cornice 68. The cornice 68 is placed in the mounting assemblies 16 of the support devices so that it can be installed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A system for supporting a cornice against a wall during installation of the cornice, said system comprising:

a pair of support devices, each support device comprising:

a tubular member, said tubular member having a first end and a second end;

an extension arm for extending from the tubular member, said extension arm being elongate, said extension arm having a shape adapted to fit in said first end of said tubular member, said arm having a first side, said first side having teeth thereon;

first and second bores, each of said bores being located in said tubular member, each of said bores being diametrically opposed;

a gear for extending said extension arm out of a said tubular member, said gear having teeth thereon;

a rod having said gear mounted thereon, said rod being rotatably mounted in said first and second bores, said gear being intermeshed with said teeth on said extension arm; and a mounting assembly for receiving said cornice, said mounting assembly having a first L-shaped portion, said mounting assembly being mounted to an end of said extension arm.

2. A system for supporting a cornice against a wall during installation of the cornice as in claim 1, said system further comprises:

said tubular member being elongate, said tubular member having a generally cylindrical shape, said tubular member being hollow; and said extension arm having a generally rectangular cross-section taken transverse to a longitudinal axis of said extension arm.

3. A system for supporting a cornice against a wall during installation of the cornice as in claim 1, further comprising:

a third bore in said tubular member, said third bore being generally adjacent to said first bore; and a pawl for selectively securing said extension arm in a position of extension from said tubular member, said pawl extending through said third bore, said pawl being in selective intermesh with said teeth of said extension arm.

4. A system for supporting a cornice against a wall during installation of the cornice as in claim 1, said mounting assembly further comprising:

a second L-shaped portion, each of said first and second L-shaped portions both having inside faces, a first wall and a second wall, said second walls extending toward each other, each of said inside faces of said first and second L-shaped portions being generally oriented in a opposed relationship to each other, wherein said first walls are adapted for directing upwardly when said mounting assembly is in use, wherein said second L-shaped portion is mounted to said first L-shaped portion.

5. A system for supporting a cornice against a wall during installation of the cornice as in claim 4, further comprising:

first and second plates, said first and second plates being fixedly coupled to said second wall of said first L-shaped portion, said first and second plates each having a bore therethough, said bores in said first and second plates being threaded;

a third plate, said third plate being mounted fixedly to said second wall of said second L-shaped portion, said third plate being located generally adjacent to a juncture of said first wall and said second wall of said second L-shaped portion, said third plate having a first bore therein, wherein said bores in said first, said second and said third plates are oriented generally coaxial to each other; and a first screw for extending and retracting said first L-shape portion with respect to said second L-shape portion, said first screw being rotatably mounted in said first bore in said third plate, said first screw being inserted through each of said bores in said first and second plates.

6. A system for supporting a cornice against a wall during installation of the cornice as in claim 5, further comprising:

a second bore in said third plate, said second bore being located generally adjacent to a free end of said third plate, said second bore having an axis oriented generally perpendicular to an axis of said first bore in said third plate;

a pair of bores, said bores being located adjacent to an end of said extension arm, said bores being diametrically opposed; and a second screw, said second screw being inserted through said pair of bores in said extension arm and said bore in said third plate, wherein said third plate is located between said pair of bores on said extension arm, wherein said third plate is adapted to swivel on said second screw.

7. A system for supporting a cornice against a wall during installation of the cornice as in claim 1, further comprising:

a foot pad for resting on a ground surface, said foot pad having a top surface and a bottom surface, said bottom surface of said foot pad having an elastomeric covering thereon, said top surface being coupled to said second end of said tubular member.

8. A system for supporting a cornice against a wall during installation of the cornice as in claim 7, further including:

a hinge, said hinge coupling said top surface of said foot pad to said second end of said tubular member, wherein said foot pad may be swiveled in relation to said tubular member.

9. A system for supporting a cornice against a wall during installation of the cornice, said system comprising:

a pair of support devices, each support device comprising:

a tubular member, said tubular member being elongate, said tubular member having a generally cylindrical shape, said tubular member being hollow, said tubular member having a first end and a second end;

an extension arm for extending from the tubular member, said extension arm being elongate, said extension arm having a generally rectangular cross-section taken transverse to a longitudinal axis of said extension arm, said extension arm having a shape adapted to fit in said first end of said tubular member, said arm having a first side, said first side having teeth thereon;

first and second bores, each of said bores being located in said tubular member, each of said bores being diametrically opposed, each of said bores being located generally adjacent to said first end of said tubular member;

a gear for extending said extension arm out of said tubular member, said gear having teeth thereon;

a rod having said gear mounted thereon, said rod being rotatably mounted in said first and second bores, said gear being intermeshed with said teeth on said extension arm;

a third bore in said tubular member, said third bore being generally adjacent to said first bore;

a pawl for selectively securing said extension arm in a position of extension from said tubular member, said pawl extending through said third bore, said pawl being in selective intermesh with said teeth of said extension arm;

a mounting assembly for receiving said cornice, said mounting assembly having a first L-shaped portion and a second L-shaped portion, each of said first and second L-shaped portions both having inside faces, a first wall and a second wall, said second walls extending toward each other, each of said inside faces of said first and second portions being generally oriented in a opposed relationship to each other, wherein said first walls are adapted for directing upwardly when said mounting assembly is in use;

first and second plates, said first and second plates being fixedly coupled to said second wall of said first L-shaped portion, each of said plates extending perpendicularly away from said second wall, said first and second plates each having a bore therethough, said bores in said first and second plates being threaded;

a third plate, said third plate being mounted fixedly to said second wall of said second L-shaped portion, said third plate being located generally adjacent to a juncture of said first wall and said second wall of said second L-shaped portion, said third plate extending perpendicular away from said second wall, said third plate having a first bore therein, wherein said bores in said first, said second and said third plates are oriented generally co-axial to each other;

a first screw for extending and retracting said first L-shape portion with respect to said second L-shape portion, said first screw being rotatably mounted in said first bore in said third plate, said first screw being inserted through each of said bores in said first and second plates;

a second bore in said third plate, said second bore being located generally adjacent to a free end of said third plate, said second bore having an axis oriented generally perpendicular to an axis of said first bore in said third plate;

a pair of bores, said bores being located adjacent to an end of said extension arm, said bores being diametrically opposed;

a second screw, said second screw being inserted through said pair of bores in said extension arm and said bore in said third plate, wherein said third plate is located between said pair of bores on said extension arm, wherein said third plate is adapted to swivel on said second screw;

a foot pad for resting on a ground surface, said foot pad having a top surface and a bottom surface, said bottom surface of said foot pad having an elastomeric covering thereon; and a hinge, said hinge coupling said top surface of said foot pad to said second end of said tubular member, wherein said foot pad may be swiveled in relation to said tubular member.

* * * * *